United States Patent [19]

Inoue et al.

[11] Patent Number: 4,685,776

[45] Date of Patent: Aug. 11, 1987

[54] INVERTED-DESIGN OPTICAL MICROSCOPE

[75] Inventors: Yasuo Inoue; Ken Yonekubo, both of Hachiouji; Masaaki Yamagishi, Ina; Itaru Endo, Hachiouji, all of Japan

[73] Assignee: Olympus Optical Co., Ltd., Tokyo, Japan

[21] Appl. No.: 647,438

[22] Filed: Sep. 5, 1984

[30] Foreign Application Priority Data

Sep. 5, 1983 [JP] Japan .............................. 58-162949

[51] Int. Cl.⁴ ....................... G02B 21/36; G02B 23/00
[52] U.S. Cl. .................................................. 350/502
[58] Field of Search ............... 350/173, 502, 507, 508, 350/511, 513, 514, 515, 516, 518, 520, 526

[56] References Cited

U.S. PATENT DOCUMENTS

| | | | |
|---|---|---|---|
| 2,838,601 | 6/1958 | Cavanagh et al. | 350/173 |
| 3,421,806 | 1/1969 | Weber | 350/502 |
| 4,210,384 | 7/1980 | Meyer et al. | 350/502 |

FOREIGN PATENT DOCUMENTS 1807713  6/1969  Fed. Rep. of Germany.
2640974  3/1978  Fed. Rep. of Germany.

*Primary Examiner*—John K. Corbin
*Assistant Examiner*—Vincent J. Lemmo
*Attorney, Agent, or Firm*—Cushman, Darby & Cushman

[57] ABSTRACT

An inverted-design optical microscope wherein, in order to lower the level of stage and the total height of a microscope body and to simplify the switching operation between an observing light path and photographing light paths, a second optical means for leading a light from an object to be inspected to the observing light path is arranged below a first optical means for leading said light alternatively to a plurality of phtographing light paths, the second optical means and first optical means are arranged respectively as fixed and movably, and a plurality of optical elements forming the first optical means and so many focusing mirrors are moved integrally by a single operating handle.

2 Claims, 6 Drawing Figures

INVERTED-DESIGN OPTICAL MICROSCOPE

BACKGROUND OF THE INVENTION (a) Field of the invention:

This invention relates to the formation particularly of the image forming optical system of an inverted-design optical microscope.

(b) Description of the Prior Art:

Generally, in an inverted-design optical microscope, optical accessory mechanisms for differential interference microscopy and fluorescence observation are arranged below an objective, as a result, an image forming optical system is formed further below it and therefore a photographing optical system for photographing can not help being set also in a considerably lower part of the microscope body. FIGS. 1 to 3 schematically show an example of the arrangement and formation of an observing optical system and photographing optical system in a conventional microscope of this kind. In the drawings, the reference numeral 1 denotes a microscope body, 2 denotes an illuminating optical axis, 3 denotes a condenser lens, 4 denotes a stage, 5 denotes a revolver, 6 denotes an objective, 7 denotes an eyepice tube, 8 denotes a prism having a semi-transparent mirror surface 8a and totally reflective mirror surface 8b which is alternatively inserted into the light path of the objective 6 from outside through a handle 8c, 9 denotes mirrors, 10 denotes an eyepiece, 11 denotes a prism having mirror surfaces 11a and 11b which is alternatively inserted into the light path of a light having passed through the semi-transparent mirror surface 8a of the prism 8 from outside through a handle 11c, 12 denotes a photographing lens arranged within the light path of a light to be reflected by the mirror surface 11a of the prism 11, 13 denotes a 35mm-film camera capable of being attached to and removed from the microscope body 1, 14 denotes a photographing lens arranged within the light path of a light to be reflected by the mirror surface 11b of the prism 11, 15 denotes a large-size camera capable of being attached and removed from the microscope body and 16 denotes a focusing glass arranged in an image forming position by the objective 6 and capable of being inserted into the light path of a light to be reflected by the semi-transparent mirror surface 8a from outside through a handle 16a. As shown in FIG. 3, when the handle 8c is switched to a position I and the handle 11c is switched to a position II, a light from an object to be inspected having passed through the objective 6 will be reflected by about 20% by the mirror surface 8a, will reach the eye of an observer through the eyepiece 10, will pass by about 80% through the mirror surface 8a, will be reflected by the mirror surface 11a of the prism 11, will then pass through the photographing lens 12 and will reach the film surface of the camera 13. Therefore, in this state, if the handle 11c is switched to a position I, the light from the object to be inspected having passed through the mirror surface 8a will be reflected by the mirror surface 11b of the prism 11, will pass through the photographing lens 14 and will reach the film surface of the large-size camera 15 attached to the camera body 1. Then, if the handle 8c is switched to a position II, the light from the object to be inspected having passed through the objective 6 will be all reflected by the mirror surface 8b and will reach the eye of the observer. In either of the above mentioned cases, if the handle 16a is switched to a position I, the focusing glass 16 will enter the observing light path. Therefore, in this state, a focusing can be made.

As described above, in the conventional inverted-design optical microscope, as the photographing optical system for photographing is arranged below the observing optical system and the passing light is led selectively to two kinds of photographing optical systems, there are various defects together with the restriction that inherently the photographing optical system can not help being set in a considerably lower part of the microscope body 1. That is to say, due to the restriction of the camera size, in either of the small film-size camera 13 and the largesize camera 15, it is necessary that the photographing optical system, that is, the photographing light path should be on a fixed level above the surface of a desk on which the microscope body 1 is to be placed. For example, in the case of using a single-lens reflex camera equipped with a motor driving device as a camera to be attached outside, the center of the photographing light path must be on a level not less than 100 mm. above the desk surface. However, in order to meet this requirement, due to such restriction on the layout in the vertical direction as is described above, the stage 4 will result to be on a level not less than 330 mm. above the desk surface. Thus, the stage 4 will be so high that the operation of the inspected object on the stage surface will be difficult, the stage handle will have to be long and the operability will be impaired. Therefore, it is not desirable.

Also, as described above, in order to lead the photographing light path to the camera attached outside, the prism 11, that is, the second reflecting optical element is required. However, in leading the light from the inspected object to the second reflecting optical element, the optical path length will be considerably wasted and therefore the photographing lens 12 will result in considerably coming into the microscope body 1. Therefore, in the case of improving the operations made with the handles 8c, 11c and 16a so as to be made by a mere switching operation with a single handle, a considerably special complicated operatively connecting mechanism will be required. This means that not only it will be impossible to realize a compact switching device but also the device will have to be so large that it will be difficult to keep the stage level low, the entire device will be expensive and the optical performance will deteriorate. By the way, as described above, in this kind of microscope, as the optical accessory mechanism is inserted below the objective, a lens for extending the image position forward is provided in front of the light path dividing element, that is, the prism 8. However, due to the magnification, there is a limit to the extension. In order to exceed the limit while meeting the magnication condition, a comparatively complicated optical system called a retrofocus type system will have to be adopted. Therefore, it will be difficult to transmit an image well corrected by the objective without impairing the good image.

Further, in the case of the conventional formation, the focusing glass 16 is only made to be able to be singly inserted into and removed from the observing optical path and therefore, by only viewing the visual field, the observer can not know which photographing optical system is in use.

SUMMARY OF THE INVENTION

In view of the above mentioned circumstances, a primary object of the present invention is to provide an inverted-design optical microscope simple in the formation and capable of being manufactured at a low cost wherein respective light paths can be switched by only switching a single operating handle, the switched state of each light path can be confirmed within the visual field and the levels of a stage and microscope base can be kept low.

According to the present invention, this object is attained by a formation wherein a light reflected by a first optical means including a semi-transparent prism or mirror is led to a photographing light path, a light having passed through the above mentioned first optical means is reflected by a second optical means set below the first optical means and is lead to an observing optical path and focusing glass corresponding respectively to the photographing light paths set in use as operatively connected with the light path switching of the above mentioned first optical means are inserted into the observing light path.

The formation wherein the second optical means leading the light from the object to be inspected to the observing light path is arranged below the first optical means leading the light to the photographing light path makes it possible to bring the photographing light path to a level high above the surface of a desk on which the microscope is to be placed. Therefore, not only there is no restriction to the size of the camera device to be attached to the advantage but also the stage level and further the total height of the microscope can be reduced, therefore the photographing and total light amount observation can be switched to each other by a very simple operation and this kind of microscope very high in the operability as a whole can be provided at a low cost.

According to a preferred formation of the present invention, the first optical means is selected to be of a transmission factor of 10 to 40% and reflection factor of 60 to 90% and the second optical means is formed of a prism or mirror arranged as fixed so that the object can be properly photographed by the cameras.

According to another preferred formation of the present invention, in order that the light from the object to be inspected may be selectively led to a plurality of photographing light paths, the first optical means consists of a plurality of optical elements arranged and combined with one another and as many focusing glasses as the above mentioned optical elements are arranged so as to be able to be selectively inserted in the object image forming position by an objective within the observing light path so that, when any one of the above mentioned plurality of optical elements is brought into the using position, one of the above mentioned plurality of focusing glasses operatively connected with and corresponding to it will be inserted into the observing light path. Thereby, not only a plurality of photographing optical paths can be easily switched to one another but also which camera is in use can be easily confirmed.

This and other objects of the present invention will become apparent during the course of the following detailed description and appended claims.

DESCRIPTION OF THE PREFERRED EMBODIMENT

Figure 1:
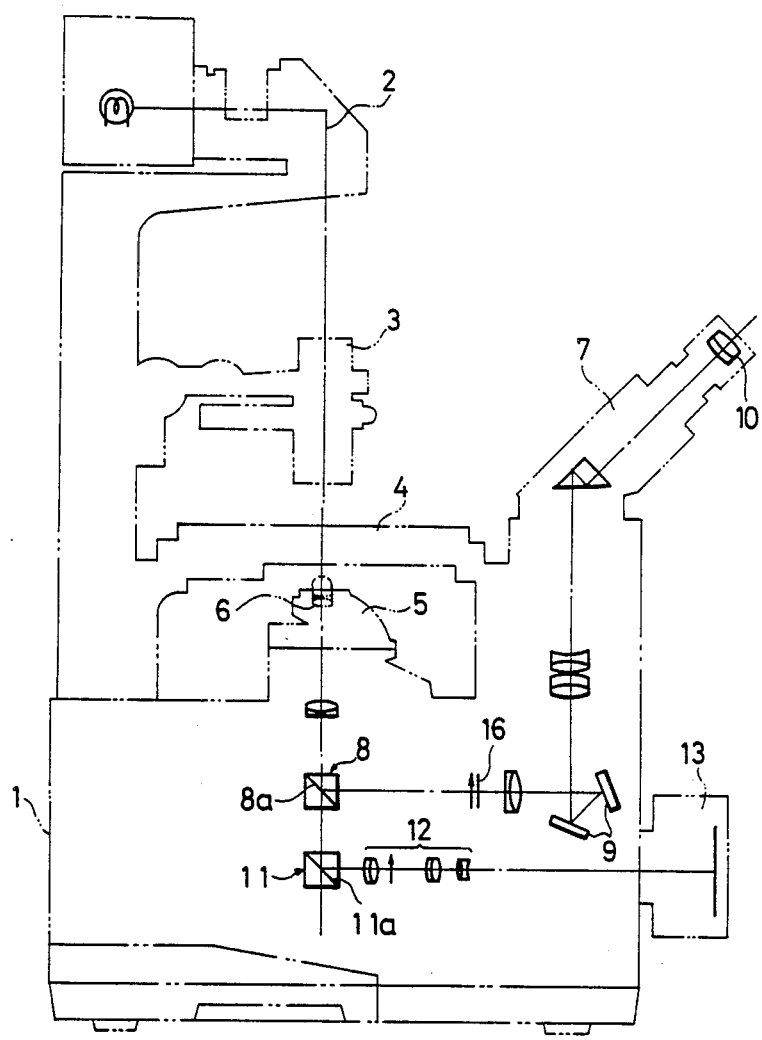
FIG. 1 is a schematic side view showing the basic arrangements of a photographing optical system and observing optical system in a conventional inverted-design optical microscope.
Figure 2:
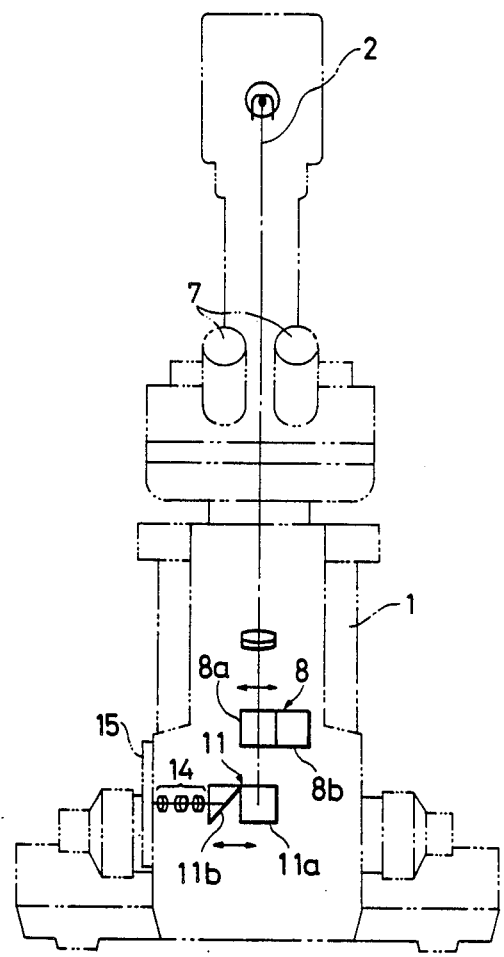
FIG. 2 is a schematic elevational view of FIG. 1.
Figure 3:
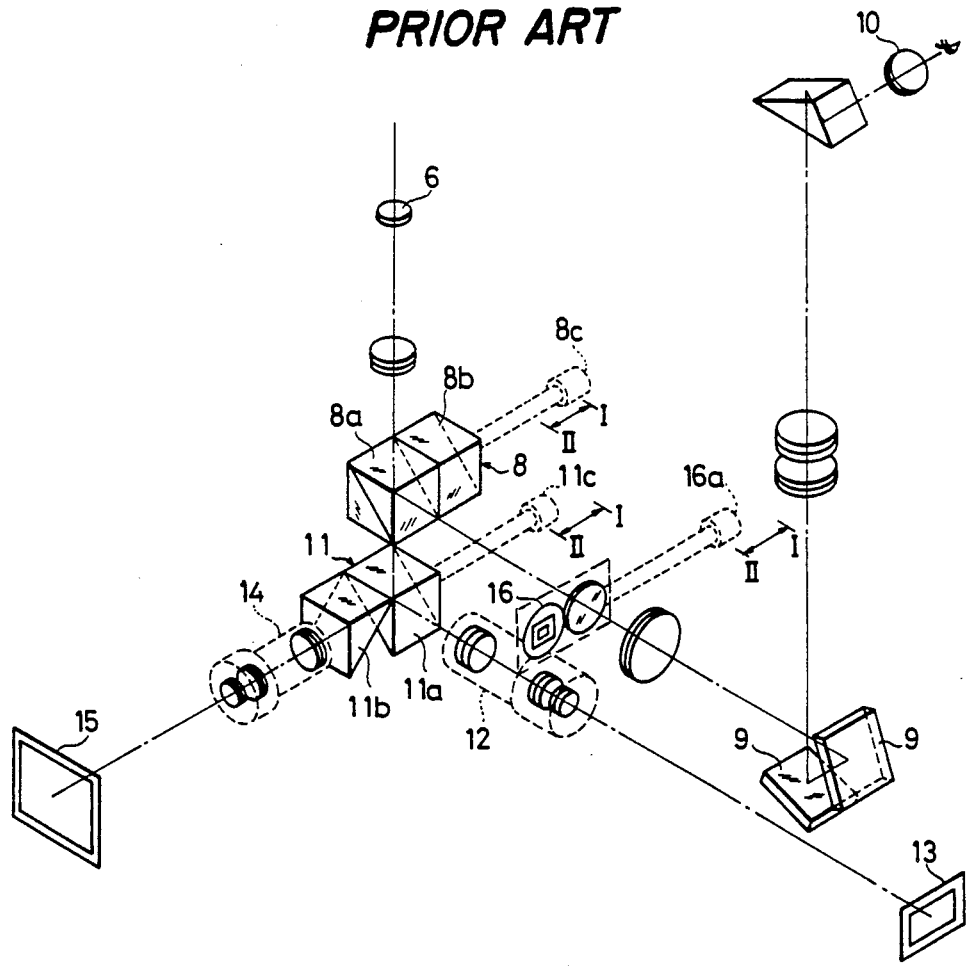
FIG. 3 is a perspective view showing the essential part formations of the conventional photographing optical system and observing optical system.
Figure 4:
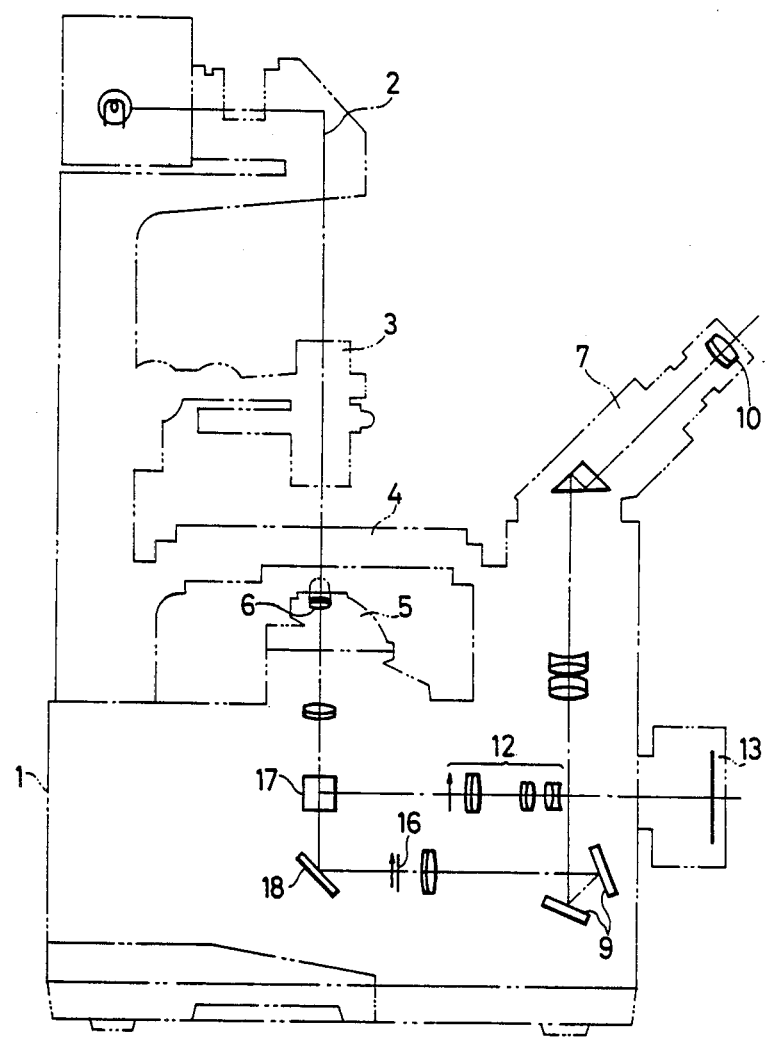
FIG. 4 is a schematic side view showing the basic arrangements of a photographing optical system and observing optical system in an inverted-design optical microscope according to the present invention.
Figure 5:
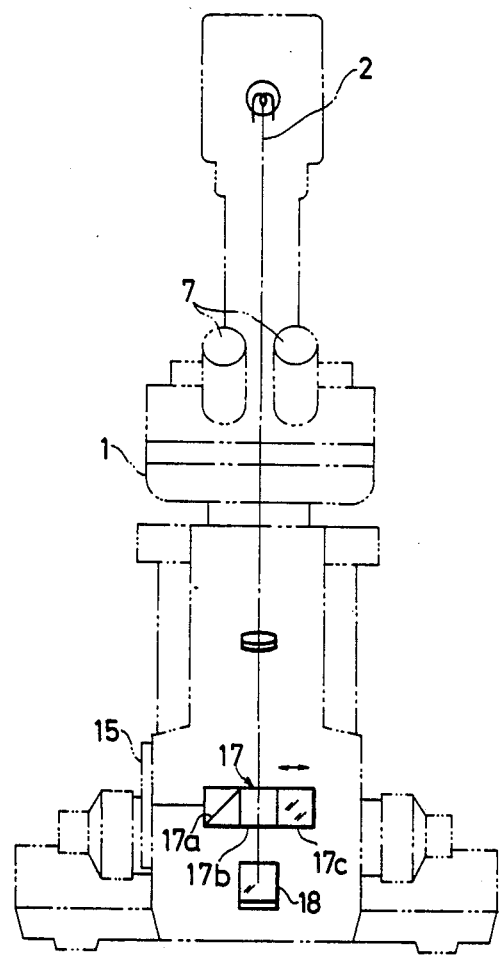
FIG. 5 is a schematic elevational view of FIG. 4.
Figure 6:
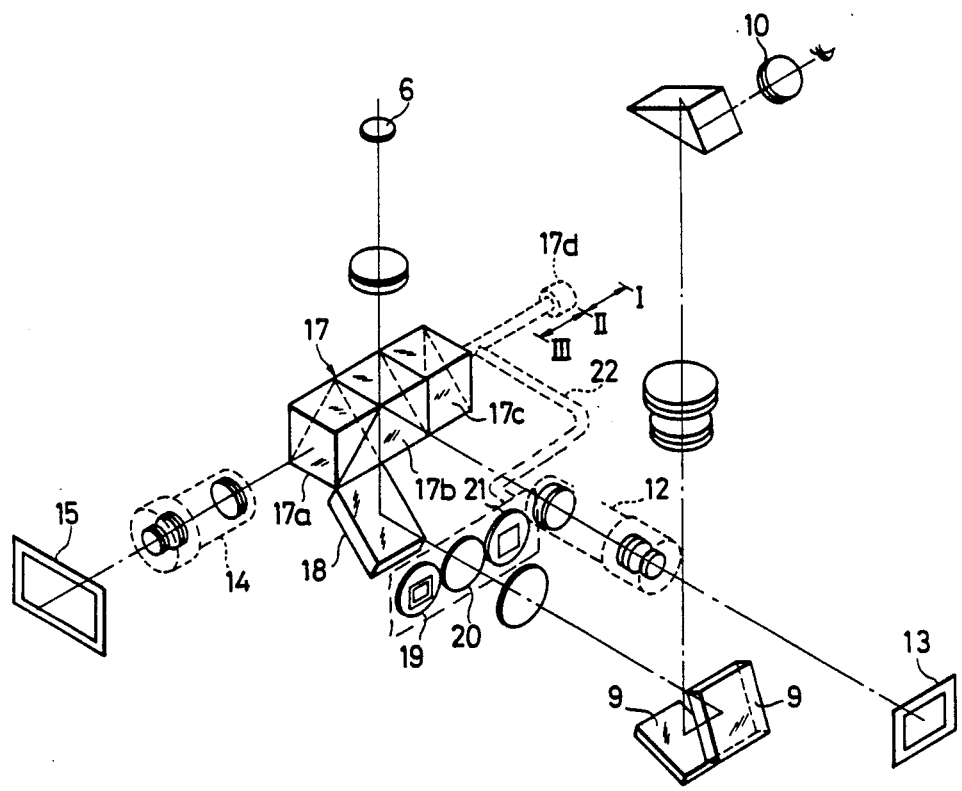
FIG. 6 is a perspective view showing the essntial part formations of the photographing optical system and observing optical system according to the present invention.

The present invention shall be described in detail in the following of the basis of the embodiment shown in FIGS. 4 to 6. In the explanation, the same reference numerals are used respectively for the substantially same optical elements and device parts as in the conventional example and their detailed explanation shall be omitted. In the drawings, the reference numeral 17 denotes a first optical means formed of a prism or mirror having a semi-transparent mirror surface 17a, transparent part 17b and semi-transparent mirror surface 17c and arranged movably within the microscope body 1 so that, when an operating handle 17d operable from outside is switched to a position I, the semi-transparent mirror surface 17a will proceed into the light path of the objective 6, will reflect a part of the light from an object to be inspected and will lead it to the film surface of the large-size camera 15 through the photographing lens 14, when the operating handle 17d is switched to a position II (the illustrated position), the transparent part 17b will proceed into the light path of the objective and will pass all the light from the object downward and further, when it is switched to a position III, the semi-transparent mirror surface 17c will proceed into the light path of the objective 6, will reflect a part of the light from the object and will be able to lead it to the film surface of the 35mm-film camera 13 through the photographing lens 12. In this case, the semi-transparent mirror surfaces 17a and 17c are formed by the vcum evaporation films, for example, of ZnS-Ag on the respective mirror surfaces. In practice, the film thickness is so selected as to be of a transmission factor of 10 to 40% (preferable 20%) and reflection factor of 60 to 90% (preferably 80%). The reference numeral 18 denotes a second optical means fixedly arranged below the first optical means 17 as aligned with the optical axis of the objective 6 and reflecting the light from the object to be inspected having passed through the first optical means 17 so as to be led to the observing light path, 19, 20 and 21 denote respectively a focusing glass, mere glass plate and focusing glass integrally connected movably in the same direction as of the first optical means 17 in an object image forming position in the rear of the second optical means 18 (between the second optical means 18 and mirrors 9) in the observing light path, the focusing glass 19 being made to proceed into the observing light path when the operating handle 17d is switched to the position I, the mere glass plate 20 being made to proceed into the observing light path when the handle 17d is switched to the position II and the focusing glass 21 being made to proceed into the observing light path when the handle 17d is switched to the position III. The focusing glasses 19 and 21 contain masks showing photographing ranges corresponding respectively to the large-size camera 15 and 35mm-film camera 13 and double cross lines (for focusing).

As the inverted-design optical microscope according to the present invention is thus formed, not only, by only switching the first optical means 17 in three steps through the operating handle 17d, the photographing with two kinds of cameras and total light amount observation can be properly selectively carried out but also, even while viewing the visual field, it can be known whether the large-size camera is in use or the 35mm-film camera is in use. Also, as the first optical means 17 for leading the light from the object to be inspected to the photographing light path is set above the second optical means for leading said light to the observing light path, the two kinds of photographing optical systems can be laid out so as to form the photographing light path on a required level above the desk surface without elevating the stage 4 and microscope base. As a result, it becomes possible to make the stage height 275mm. (335mm. in the conventional microscope) and the lamp house height 600mm. (660mm. in a conventional microscope) so that the operability relating to the exchange and movement of samples on the stage 4 can be improved. Also, the microscope is so small in the total height as to be able to be set within a limited clean bench. Further, the mechanism of operatively connecting the first optical means 17 with the focusing glasses 19 and 21 can be formed so simply that the entire structure can be made compact. As the object image can be formed in a position comparatively far from the first optical means 17 on the photographing light path, even if the first optical means 17 is switched in three steps, it will not interfere with the photographing lens 14 and the expected optical performance will be able to be developed.

By the way, in the embodiment, the first optical means 17 is so formed as to be switched in three steps. However, by removing the transparent part, that is, by omitting the total light amount observing function, it can be made to be of a two-step switching system. It is needless to say that, in such case, too, the above described various effects can be developed.

What is claimed is:

1. An inverted design optical microscope comprising a first optical means reflecting a part of light from an object to be inspected and passing the rest of the light, an observing optical system arranged in association with said first optical means, a plurality of photographing optical systems arranged in association with said first optical means, and a second optical means arranged below said first optical means and reflecting the light having passed through said first optical means, said first optical means including a plurality of members, one of which has a transmission factor of 100% and the others of which have a reflection factor of 60 to 90% and a transmission factor of 10 to 40%, held integrally to each other and capable of being alternatively switched to be inserted into an observing light path and any one of a plurality of photographing light paths by an operating handle, said light having passed through said first optical means being led to the observing light path through said second optical means and said light reflected by said first optical means being led to any one of the photographing light paths.

2. An inverted-design optical microscope comprising a first optical means reflecting a part of a light from an object to be inspected and passing the rest of the light, an observing optical system arranged in association with said first optical means, and a plurality of photographing optical systems arranged in association with said first optical means, the light reflected by said first optical means being led to a plurality of photographing light paths, and the light having passed through said first optical means being led to an observing light path, and wherein said microscope further comprises a plurality of focusing glasses coupled integrally to one another and capable of being alternatively inserted into an object image forming position by an objective within said observing light path, and a second optical means fixedly arranged below said first optical means so as to lead the light from the object to be inspected having passed through said first optical means to said observing light path, said first optical means is connected integrally with said plurality of focusing glasses through a manually operable handle, said first optical means comprises as many half-prisms or half-mirrors as said focusing glasses movably arranged so as to lead the light from the object alternatively to plurality of photographing light paths and capable of being brought alternatively to a position aligned with said second optical means and, when any one of said plurality of half-prisms or half-mirrors is aligned with said second optical means, the corresponding one of said plurality of focusing glasses is inserted into the observing light path.

* * * * *